United States Patent
Hasegawa et al.

(10) Patent No.: US 7,977,899 B2
(45) Date of Patent: Jul. 12, 2011

(54) MOTOR CONTROLLING DEVICE, MOTOR DRIVE SYSTEM, METHOD OF MOTOR CONTROL, SEMICONDUCTOR DEVICE AND ELECTRONIC DEVICE

(75) Inventors: Yukihisa Hasegawa, Machida (JP); Kazunobu Nagai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 413 days.

(21) Appl. No.: 12/053,860

(22) Filed: Mar. 24, 2008

(65) Prior Publication Data
US 2009/0001922 A1 Jan. 1, 2009

(30) Foreign Application Priority Data
Jun. 29, 2007 (JP) .................... 2007-172674

(51) Int. Cl.
*H02P 6/00* (2006.01)
(52) U.S. Cl. ......... 318/400.01; 318/400.14; 318/400.32; 318/721
(58) Field of Classification Search ............ 318/400.01, 318/400.26, 700, 727, 811, 801, 721, 400.02, 318/560, 400.14, 800, 437, 599, 400.32
See application file for complete search history.

(56) References Cited

U.S. PATENT DOCUMENTS

| | | | |
|---|---|---|---|
| 5,491,393 A * | 2/1996 | Uesugi .................. | 318/400.28 |
| 6,388,416 B1 * | 5/2002 | Nakatani et al. ........... | 318/700 |
| 6,400,116 B1 * | 6/2002 | Chen et al. ............... | 318/599 |
| 6,448,725 B1 * | 9/2002 | Cho et al. ............ | 318/400.04 |
| 6,538,404 B2 * | 3/2003 | Kato et al. ............ | 318/400.06 |
| 7,095,195 B2 * | 8/2006 | Tagome et al. ............. | 318/268 |
| 7,126,301 B2 * | 10/2006 | Nishihara et al. ........ | 318/400.27 |

FOREIGN PATENT DOCUMENTS
CN 1306340 A 8/2001

OTHER PUBLICATIONS

"Application Note" published by Infineon Technologies AG, Germany, AP08059 XC886/888 CM/CLM, V1.0, May 2007, p. 12.
A 8-bit microcontroller model TMP88CH41UG manufactured by Toshiba Corporation, Tokyo.
Chinese Office action for 200810128585 dated Jun. 9, 2010.

* cited by examiner

*Primary Examiner* — Walter Benson
*Assistant Examiner* — Antony M Paul
(74) *Attorney, Agent, or Firm* — Pearne & Gordon LLP

(57) ABSTRACT

A motor control device is disclosed which is arranged so as to perform a PWM control for a permanent magnet motor including a rotor having a permanent magnet and a stator with a multiphase winding. The motor control device includes a position detection unit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages, and a digital processing unit which has a function of generating and delivering a sinusoidal PWM signal based on the rotational position signal, thereby controlling the motor.

16 Claims, 11 Drawing Sheets

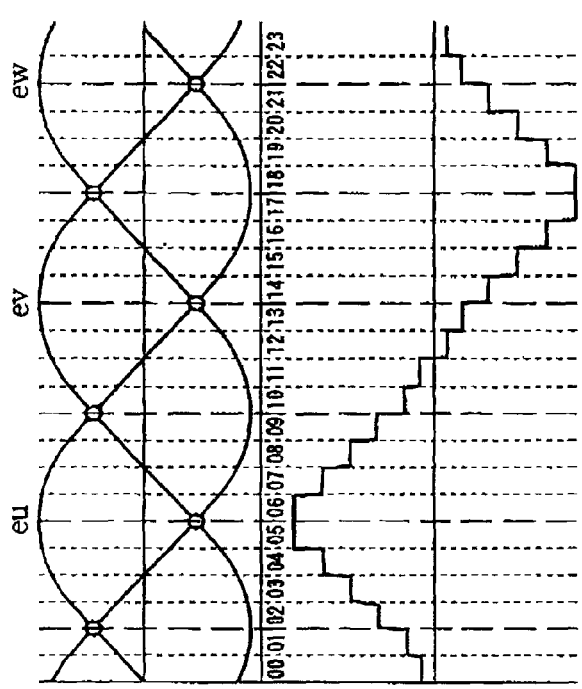
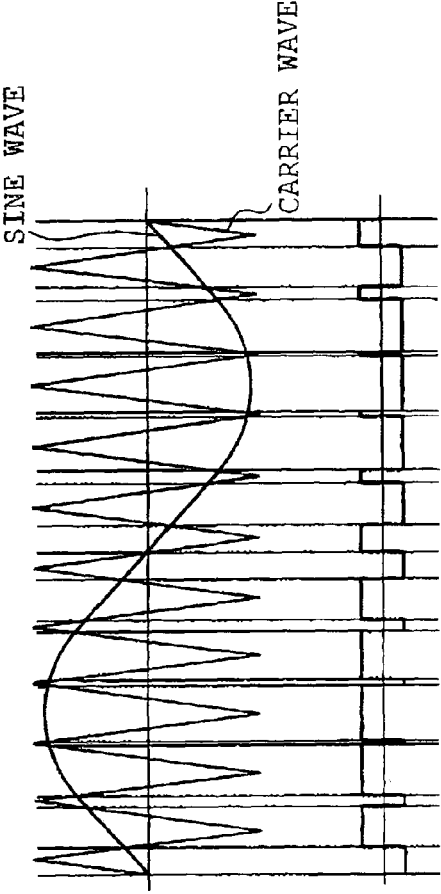
FIG. 9A INDUCED VOLTAGE
FIG. 9B DUTY COMMAND VALUE OF PWM SIGNAL
FIG. 9C SINE WAVE AND CARRIER WAVE
FIG. 9D PWM SIGNAL

MOTOR CONTROLLING DEVICE, MOTOR DRIVE SYSTEM, METHOD OF MOTOR CONTROL, SEMICONDUCTOR DEVICE AND ELECTRONIC DEVICE

CROSS-REFERENCE TO RELATED APPLICATIONS

This application is based upon and claims the benefit of priority from the prior Japanese Patent Application No. 2007-172674 filed on Jun. 29, 2007, the entire contents of which are incorporated herein by reference.

BACKGROUND OF THE INVENTION

1. Field of the Invention

The present invention generally relates to a permanent magnet motor comprising a rotor having permanent magnets and a stator provided with a multiphase winding, and more particularly to a motor control device and method for controlling the permanent magnet motor by a pulse width modulation (PWM) technique, and a motor drive system including the motor control device.

2. Description of the Related Art

A position sensorless control system is conventionally known as a technique for obtaining a rotational position signal of a rotor from motor voltage, current or the like by computation without use of Hall ICs etc., thereby controlling a brushless DC motor based on the positional signal. Furthermore, when a brushless DC motor is driven via an inverter circuit by a PWM control, a microcomputer incorporated with a functional part specialized for the sensorless motor control has been commercialized. When the aforesaid microcomputer carries out computation for the position sensorless control by software processing, the PWM control by the position sensorless manner can be realized by use of a single microcomputer. For example, a microcomputer executing the above-described control is disclosed by a document, "Application Note" (published by Infineon Technologies AG, Germany, AP08059 XC886/888 CM/CLM, V 10, May 2007) An about 8-bit microcomputer is generally selected for motor control purposes when an increase in costs should be restrained.

However, the computation for execution of position sensorless drive imposes heavy processing load on microcomputer software and accordingly necessitates longer time. Accordingly, the setting of PWM control period is sometimes limited (see FIG. 11 of the above-referenced document, 3. 2. 1 Node 2 Interrupt Disabled, page 12). For example, when a 16-bit microcomputer is used, processing can be carried out at higher speeds In this case, an increase in costs cannot be avoided although the above-described limitation can be overcome.

SUMMARY OF THE INVENTION

Therefore, an object of the present invention is to provide a motor control which can restrain cost increase, can realize a higher processing speed and can provide good controllability.

To achieve the advantage, one aspect of the present invention provides a motor control device which is arranged so as to perform a PWM control for a permanent magnet motor including a rotor having a permanent magnet and a stator provided with a multiphase winding, the device comprising a position detection unit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages, and a digital processing unit which has a function of generating and delivering a sinusoidal PWM signal based on the rotational position signal, thereby controlling the motor.

The invention also provides a motor control system comprising a permanent magnet motor including a rotor having a permanent magnet and a stator provided with a multiphase winding, a position detection unit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages, a digital processing unit which has a function of generating and delivering a sinusoidal PWM signal based on the rotational position signal, thereby controlling the motor, and an inverter circuit which drives the motor based on the PWM signal delivered by the digital processing unit.

The invention further provides a semiconductor device which is arranged so as to perform a PWM control for a permanent magnet motor including a rotor having a permanent magnet and a stator provided with a multiphase winding, the semiconductor device comprising a position detection circuit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages, and a microcomputer which has a function of generating and delivering a sinusoidal PWM signal based on the rotational position signal, thereby controlling the motor.

The invention still further provides an electronic device which is arranged so as to perform a PWM control for a permanent magnet motor including a rotor having a permanent magnet and a stator provided with a multiphase winding, the electronic device comprising a position detection circuit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages, and a microcomputer which has a function of generating and delivering a sinusoidal PWM signal based on the rotational position signal, thereby controlling the motor.

The above-described motor control device and semiconductor device can each control costs and realize a high speed high controllable motor control.

The above-described motor drive system can provide a system which can control costs and realize a high speed high controllable motor control.

The above-described motor control method can control costs and realize a high speed high controllable motor control.

BRIEF DESCRIPTION OF THE DRAWINGS

Other objects, features and advantages of the present invention will become clear upon reviewing the following description of the embodiment with reference to the accompanying drawings, in which:

FIG. 9 is a waveform chart showing a sinusoidal voltage waveform delivered by the microcomputer;

DETAILED DESCRIPTION OF THE INVENTION

Figure 1:
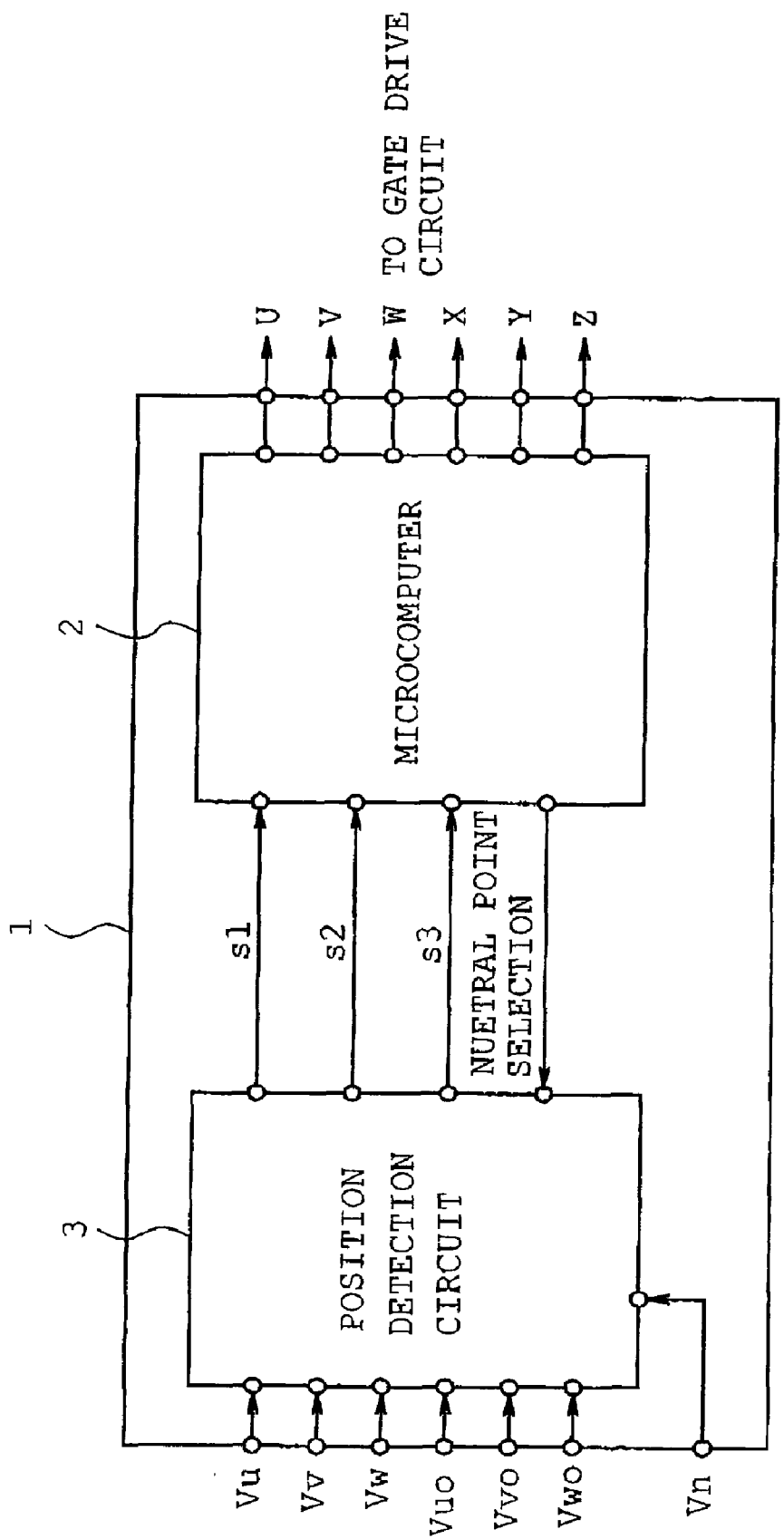
FIG. 1 shows a schematic electrical arrangement of a drive control IC of a first embodiment of the present invention.

A first embodiment of the present invention will be described with reference to FIGS. 1 to 9. Referring to FIG. 1, a drive control IC 1 for a brushless DC motor is shown. The drive control IC 1 or semiconductor device (or semiconductor integrated circuit device) or a motor control device comprises a microcomputer 2 with a function of performing a sine wave drive of an electric motor by a PWM control and a position detection circuit 3. An 8-bit microcontroller model TMP88CH41 manufactured by the assignee, Toshiba Corporation, Tokyo is exemplified as the above-mentioned drive control IC 1. When housed in a single IC package, the drive control IC 1 may be regarded as a microcomputer.

Figure 2A:
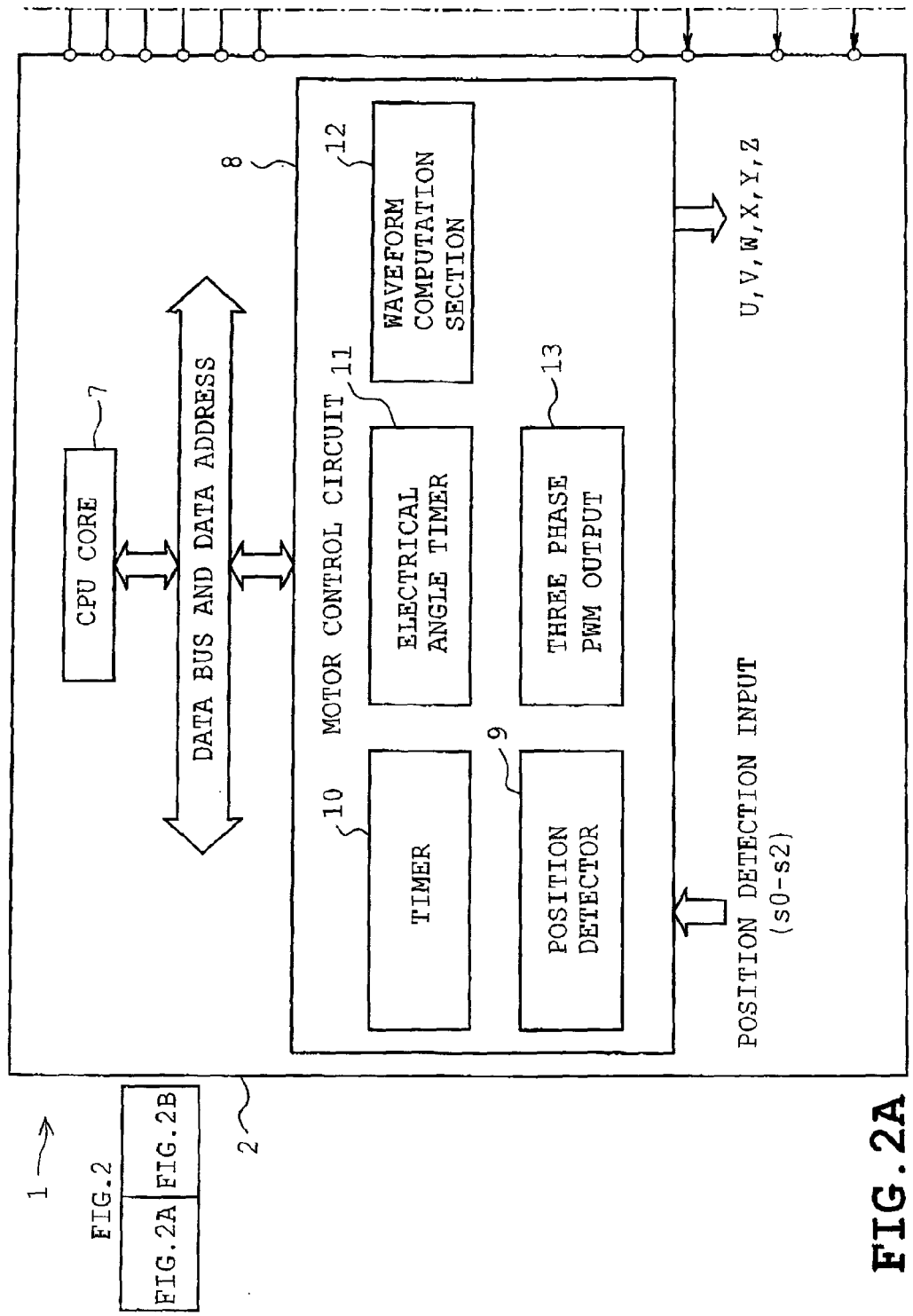
FIGS. 2A and 2B show an electrical arrangement in which a brushless DC motor is connected via a gate drive circuit and an inverter circuit to the drive control IC.
Figure 2B:
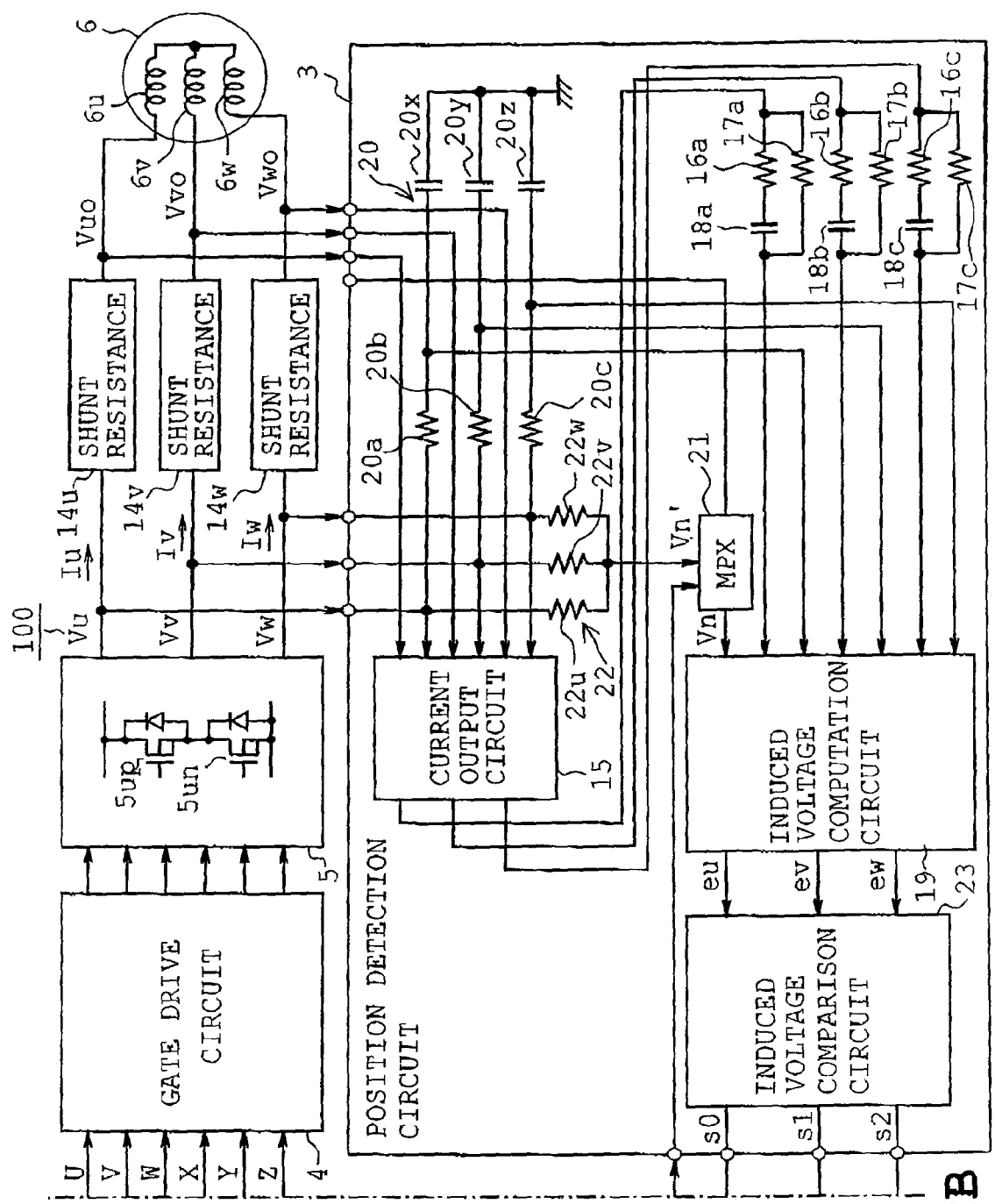

Referring now to FIGS. 2A and 2B, a brushless DC motor 6 is connected via a gate drive circuit 4 and an inverter circuit 5 to the drive control IC 1. The brushless DC motor 6 may be a spindle motor for turning a recording media such as a digital versatile disc (DVD), a compact disc (CD) or a hard disc drive (HDD). Alternatively, the brushless DC motor 6 may be a pump motor for delivering fuel in automotive vehicles. The brushless DC motor 6 is a permanent magnet motor comprising a rotor having permanent magnets and a stator provided with three-phase windings $6u$, $6v$ and $6w$. The arrangement as shown in FIGS. 2A and 2B with exception of the motor 6 constitutes a motor drive system 100.

Regarding the microcomputer 2, FIGS. 2A and 2B show a part (motor control circuit) relating mainly to a motor control function. The microcomputer 2 includes a CPU core 7 which controls a motor control circuit 8 via an address bus and a data bus. The motor control circuit 8 comprises a position detection section 9 detecting a change timing of position signals s0 to s2 supplied from the position detection circuit 3, a timer section 10 generating events at times corresponding to three electrical angles based on results of detection by the position detection section 9, an electrical angle timer section 11 counting electrical angles, a waveform computation section 12 computing a PWM duty for output of a sinusoidal waveform and a three-phase PWM output section 13 which delivers three-phase PWM signals (U, V, X, X, Y and Z in upper and lower arms).

Figure 3:
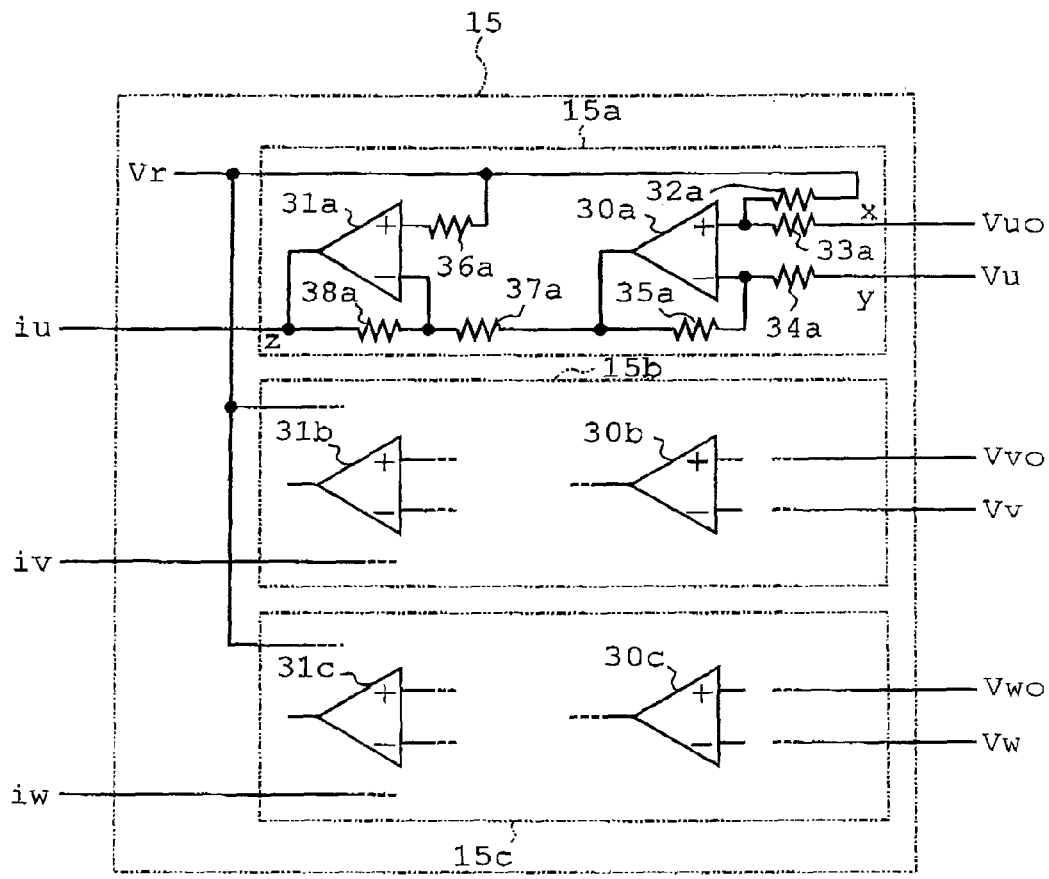
FIG. 3 is a schematic circuit diagram showing a current detection circuit.

The inverter circuit 5 comprises six field effect transistors (FETs) which are provided between a power supply line and a ground line connected in a three-phase bridge configuration. FIG. 1 shows only FETs $5up$ and $5un$ constituting phase U upper and lower arms. Shunt resistances $14u$, $14v$ and $14w$ each exemplifying a current detection unit are connected between three-phase output ends of the inverter circuit 5 and three-phase windings $6u$, $6v$ and $6w$ respectively. To a current detection circuit 15 of the position detection circuit 3 are applied output voltages Vu, Vv and Vw of the inverter circuit 5 and voltages Vu0, Vv0 and Vw0 applied to three-phase windings $6u$, $6v$ and $6w$ of the motor 6, namely, voltages between both ends of the shunt resistances $14u$, $14v$ and $14w$, respectively. The current detection circuit 15 delivers current signals iu, iv and iw according to output currents Iu, Iv and Iw of the inverter circuit 5 based on an interterminal voltage of the shunt resistances $14u$, $14v$ and $14w$, respectively and has an electrical arrangement as shown in FIG. 3.

Current detection circuits $15a$, $15b$ and $15c$ of the phases U, V and W have the same arrangement. For example, the current detection circuit $15a$ comprises a differential amplifier circuit including an operational amplifier $30a$ and resistances $32a$ to $35a$ and an inverting amplifier circuit including an operational amplifier $31a$ and resistances $36a$ to $38a$. A reference voltage Vr is generated by a reference voltage generating circuit (not shown) so as to be half of a power supply voltage Vcc, for example. The reference voltage Vr is supplied via the resistances $32a$ and $36a$ to non-inverting input terminals of the operational amplifiers $30a$ and $31a$ respectively. The current detection circuits $15a$, $15b$ and $15c$ deliver output signals iu, iv and iw which are supplied to an induced voltage computation circuit 19 via a circuit comprising resistances $16a$, $16b$ and $16c$ and $17a$, $17b$ and $17c$ and capacitors $18a$, $18b$ and $18c$ respectively as shown in FIGS. 2A and 2B.

The inverter circuit 5 has output terminals to which a filter circuit 20 is connected in the position detection circuit 3. Output signals of the filter circuit 20 are supplied to the induced voltage computation circuit 19. The filter circuit 20 comprises resistances $20a$, $20b$ and $20c$ connected between the three-phase output terminals and the ground and capacitors $20x$, $20y$ and $20z$ respectively. Series circuits of the resistances $16a$, $16b$ and $16c$ and the capacitors $18a$, $18b$ and $18c$ are connected between output terminals of the current detection circuits $15a$, $15b$ and $15c$ and input terminals of the induced voltage computation circuit 19 respectively. The resistances $17a$, $17b$ and $17c$ are connected in parallel to the aforesaid series circuits respectively. The resistances $16a$, $16b$ and $16c$ are provided for preventing oscillation.

The current signals iu, iv and iw are supplied from the current detection circuits $15a$, $15b$ and $15c$ via the aforesaid circuits to the induced voltage computation circuit 19 serving as an induced voltage computation unit respectively. Voltages vu, vv and vw having passed through the filter circuits $20a$, $20b$ and $20c$ are also supplied to the induced voltage computation circuit 19. The induced voltage computation circuit 19 is adapted to deliver induced voltage signals eu, ev and ew according to the induced voltages Eu, Ev and Ew respectively.

Figure 4:
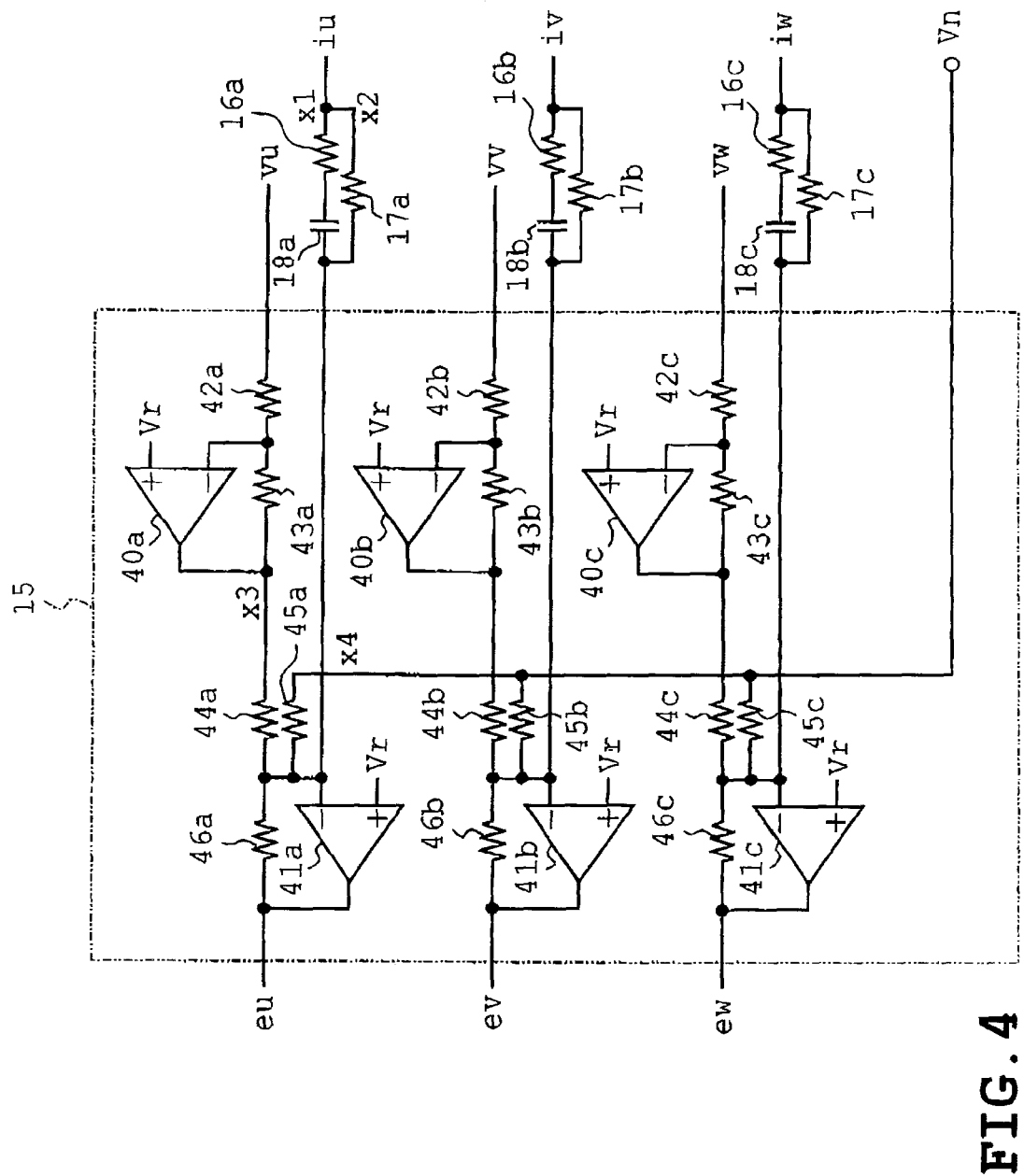
FIG. 4 is a circuit diagram showing an induced voltage computation circuit.

FIG. 4 shows an arrangement of the induced voltage computation circuit 19. The three phases of the induced voltage computation circuit 19 have the same arrangement. For example, phase U of the induced voltage computation circuit 19 comprises an inverting amplifier circuit including an operational amplifier 40a and resistances 42a and 43a and an adder circuit including an operational amplifier 41a and resistances 44a, 45a and 46a. A neutral-point voltage signal vn is supplied via an external multiplexer 21 serving as a voltage selection unit to the adder circuit.

Referring to FIG. 2, a virtual neutral point voltage Vn' appears at a common node of the resistances 22u, 22v and 22w connected to the respective phase output terminals of the inverter circuit 5. The virtual neutral point voltage Vn' is supplied to the multiplexer 21. The neutral-point voltage Vn is also supplied to the multiplexer 21 by connecting a neutral point of the motor 6 directly to the input terminals of the position detection circuit 3. The multiplexer 21 selects either supplied voltage according to a selection signal supplied thereto from the microcomputer 2, thereby delivering the selected voltage to the induced voltage computation circuit 19. The resistances 22u, 22v and 22w constitute a resistance circuit 22.

Figure 5:
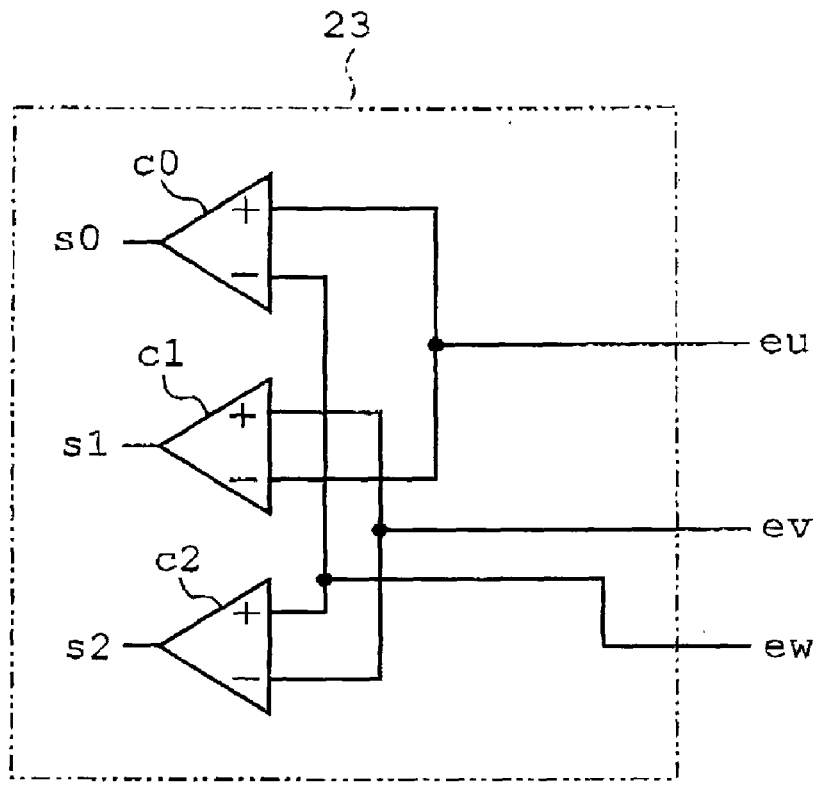
FIG. 5 is a circuit diagram showing an induced voltage comparison circuit.

Referring further to FIG. 2, the induced voltage signals eu, ev and ew delivered by the induced voltage computation circuit 19 are supplied to an induced voltage comparison circuit 23. The induced voltage comparison circuit 23 compares one of the induced voltage signals eu, ev and ew with another and has an arrangement as shown in FIG. 5. Comparators c0, c1 and c2 compare the induced voltages eu and ew, ev and eu, and ew and ev, thereby generating position signals s0, s1 and s2, respectively. The arrangement of the position detection circuit 3 depends partially upon an electrical arrangement disclosed in JP-A-2006-254626 in which the applicant is identical with the assignee in the present application.

The position signals s0, s1 and s2 are delivered by the induced voltage comparison circuit 23 thereby to be supplied to input ports of the microcomputer 2 respectively. The input ports are designated by symbols "PDU," "PDV" and "PDW" in the above-referenced product of Toshiba Corporation. The position detection section 9 of the microcomputer 2 generates a position detection interrupt signal INTPDC according to the position signals s0, s1 and s2.

The operation of the drive control IC 1 will now be described with reference to FIGS. 6 to 8. Firstly, the operation of the current detection circuits 15a-15c will be described with reference to FIG. 3. For example, in the current detection circuit 15a of phase U, the resistances 32a, 33a, 34a and 35a have the same resistance value. The initial stage differential amplifier circuit employing the operational amplifier 30a delivers a difference between input voltages designated by symbols x and y in FIG. 3 on the basis of the reference voltage Vr. The subsequent stage inverting amplifier circuit employing the operational amplifier 31a has an amplification factor of −Rb/Ra when Ra and Rb designate resistance values of the resistances 37a and 38a respectively. Accordingly, voltage z delivered by the current detection circuit 15a is obtained by the following equation (1):

$$z=(Rb/Ra)(y-x)+Vr \quad (1)$$

Since voltage (y−x) is a voltage drop of the shunt resistance 14u due to current Iu flowing into the winding 6u of the motor 6, the output voltage z is equivalent to the current signal iu in proportion to the winding current Iu. The other current detection circuits 15b and 15c operate in the same manner as described above. As a result, the current detection circuits 15a, 15b and 15c deliver the current signals iu, iv and iw in proportion to the currents Iu, Iv and Iw flowing into the windings 6u, 6v and 6w respectively.

Subsequently, the operation of the induced voltage computation circuit 19 will be described with reference to FIG. 4. Output voltages Vu, Vv and Vw of the inverter circuits 5a, 5b and 5c have waveforms switched by the PWM signals respectively. Accordingly, the output voltages Vu, Vv and Vw are supplied via the filter circuit 20 to the induced voltage computation circuit 19. The voltages vu, vv and vw having passed through the filter are inverted thereby to be amplified, being supplied to the adder circuits, respectively. When the phase U induced voltage computation circuit is exemplified, reference symbols x1 to x4 in FIG. 4 designate voltages of various parts. Symbols R1, R2, R3, R4 and R5 designate resistance values of the resistances 16a, 17a, 44a, 45a and 46a respectively. Symbol C1 designates a capacitance of the capacitor 18. In this case, the output voltage z is shown by the following equation (2):

$$z=-R5 \cdot C1 \cdot dx1/dt-(R5/R2)x2-(R5/R3)x3-(R5/R4)x4 \quad (2)$$

Each of the voltages x1 and x2 corresponds to current signal iu. Voltage x3 corresponds to voltage signal −vu. Voltage x4 corresponds to a neutral point voltage signal Vn. (R5/R2) is set at a value obtained by multiplying inductance L of one phase of the motor 6 by an inverse of resistance value of shunt resistance 8u, and (R5/R2) is set at a value obtained by multiplying winding resistance R of one phase of the motor 6 by the inverse of resistance value of shunt resistance 8u. Furthermore, both of (R5/R3) and (R5/R4) are set at 1. In this case, equation (3) is obtained:

$$z=-L \cdot dIu/dt-R \cdot Iu+vu-Vn \quad (3)$$

Figure 6:
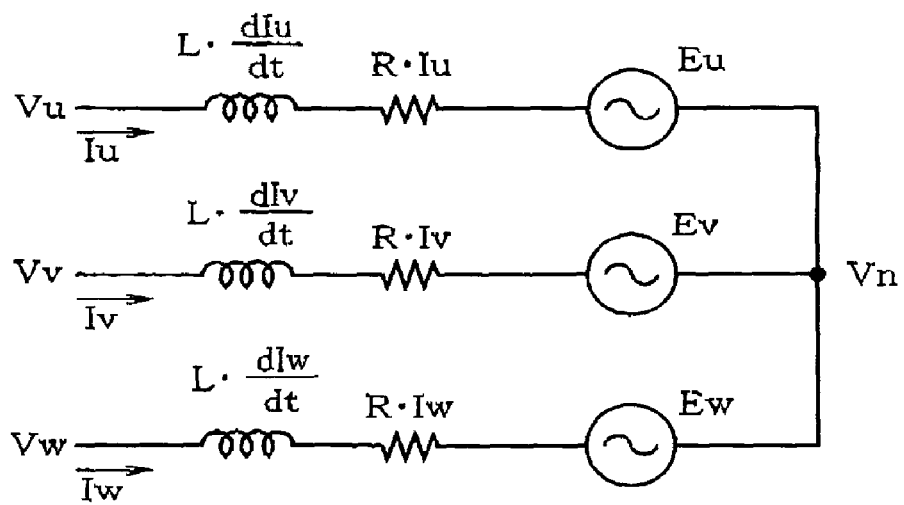
FIG. 6 is an equivalent circuit schematic of the motor.
Figure 7:
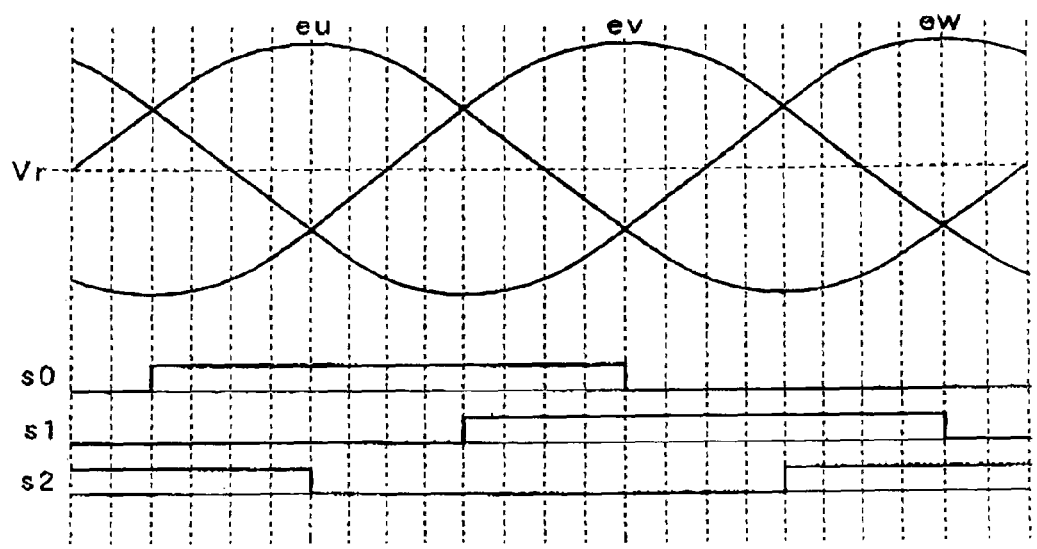
FIG. 7 is a waveform chart showing waveforms of induced voltage signals eu, ev and ew and position signals s0 to s2.

When compared with an equivalent circuit to the motor 6 as shown in FIG. 6, output voltage z equals the induced voltage Eu. The same is applied to each of the other phases. Thus, the induced voltage computation circuit 19 delivers induced voltage signals eu, ev and ew according to the induced voltages Eu, Ev and Ew, Subsequently, the operation of the induced voltage comparison circuit 23 will be described. FIG. 7 shows waveforms of induced voltage signals eu, ev and ew and output signals s0 to s2 of comparators c0 to c2 respectively. One period is segmented into six regions by the signals s0 to s2 when the induced voltage signals eu, ev and ew are sinusoidal. More specifically, an electrical period is segmented into two parts by the signals s0 to s2 of the comparator c0 so that the parts correspond to "0" and "1." Since the output signals s0 to s2 of the three comparators c0 to c2 have different timings, one electrical period is segmented into six parts each of which has an angle of about 60 degrees. The six parts correspond to position detection modes 0 to 5 in the microcomputer 2.

Figure 8:
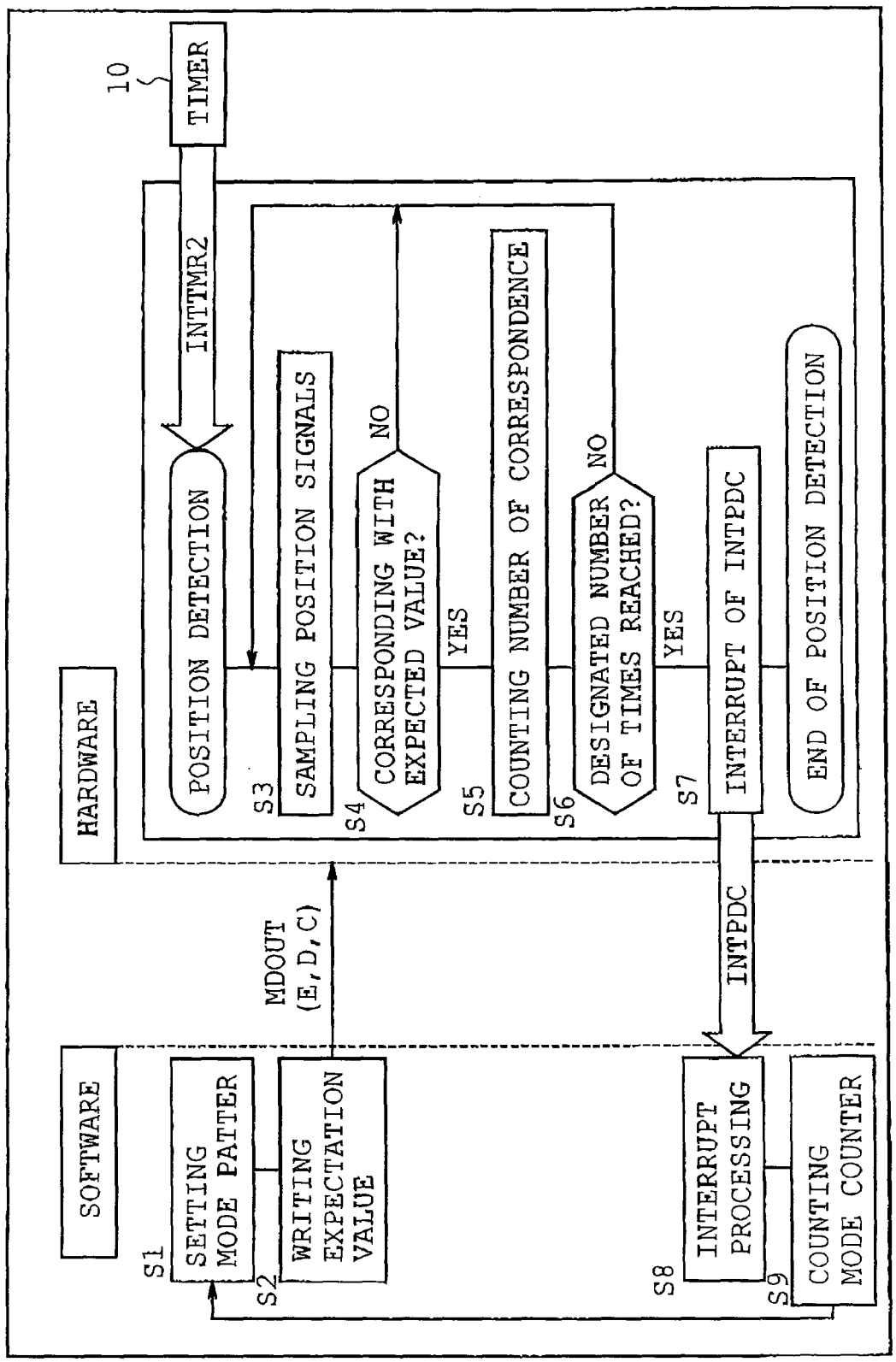
FIG. 8 is a flowchart showing outline of general motor control by a microcomputer.

With reference to FIG. 8, the following describes the operation of the microcomputer 2 to which the aforesaid output signals s0 to s2 are supplied. FIG. 8 is a flowchart showing outline of general motor control by a microcomputer 2 as a product. FIG. 8 mainly shows processing in relation to the position detection section 9. SOFTWARE in the figure designates a process the CPU core 7 of the microcomputer 2 executes in accordance with a control program. HARDWARE designates a process carried out by hardware logic arranged in the microcomputer 2. Furthermore, the microcomputer 2 supplies a signal to the multiplexer 21 so that either the virtual neutral position voltage Vn' or neutral point voltage Vn of the motor 6 is selected at an initial stage, although this is not shown in FIG. 8. Firstly, a mode pattern is set (step S1). The mode pattern is a patter of combination of high and low states of the position signals s0 to s2 which change every electrical angle of 60°. One of the mode patterns is written onto an output register as an expectation value (step 32).

On the other hand, at the hardware side, a position detection process starts upon occurrence of INTTMR2 from the timer section 10 so that the position signals s0 to s2 are sampled (step S3). Sampling is repeated until the result thereof agrees with the expectation value (NO at step S4). When the sampling result agrees with the expectation value (YES), the number of times of agreement is counted up (step S5). The sampling is repeated until the aforesaid number of times of agreement reaches a predetermined number of times (NO at step S6). When the number of times of agreement reaches the predetermined number of times (YES), the position detection section 9 causes the CPU core 7 to produce INTPDC interrupt (step S7). The CPU core 7 then carries out processing corresponding to the interrupt (step S8) The CPU core 7 counts up the mode counter (repeating count values 0 to 5; and step S9), returning to step S1. The arrangement of the position detection section 9 corresponding to the above-described processing is described on page 92 of the user's manual (Mar. 6, 2003 version) for the above-referenced model TMP88CH41 with reference to FIG. 2-48.

FIGS. 9A to 9D show sinusoidal voltage waveforms delivered by the three-phase PWM output section 13 of the microcomputer 2. FIG. 9A shows three-phase induced voltage waveform. A cross point of any two-phase waveforms serves as a changing point of position detection mode at every electrical angle of 60°. FIG. 9B shows duty command values corresponding to the sine waves. An interval between mode changing points in FIG. 9A is measured by a counter. For example, when a counted value is divided into quarters, an interval of 15° by electrical angle is obtained. Accordingly, a command value is changed every 15°.

FIG. 9C shows a triangular wave which is a carrier wave in the PWM control and a sine wave both corresponding to phase U. The triangular wave and the sine wave are superimposed although the shown carrier wave frequency is lower than an actual value for convenience of diagrammatic representation. A PWM signal shown in FIG. 9D is formed by comparison of the command value shown in FIG. 9B and the carrier wave shown in FIG. 9C by a comparator. The PWM signal is applied via the inverter circuit 5 to the three-phase windings 6u, 6v and 6w of the motor 6 so that a sinusoidal drive voltage is supplied to the motor 6.

According to the above-described embodiment, the drive control IC 1 comprises the position detection circuit 3 and the microcomputer 2. The position detection circuit 3 executes an analog computation process for the three-phase induced voltages eu, ev and ew based on voltage, current and a motor constant of the motor 6 and a phase voltage equation, thereby generating and delivering rotational position signals s0 to s2 of the rotor based on a phase relation of the induced voltages. The microcomputer 2 has a function of generating and delivering three-phase PWM signals based on the rotational position signals s0 to s2. The three-phase PWM signals are supplied from the microcomputer 2 to the motor 6 so that the motor 6 is driven via the inverter circuit 5. Accordingly, the position detection circuit 3 carries out the computation of the rotational position signals s0 to s2 at high speeds by hardware. The microcomputer 2 generates and delivers the PWM signals based on the rotational position signals s0 to s2. Consequently, even when an 8-bit microcomputer having a relatively lower performance is used, the position sensorless control can be realized at lower costs while the restrictions of PWM control period are reduced. Furthermore, since the microcomputer 2 is configured to be capable of delivering sinusoidal PWM signals to the motor 6, the embodiment can effectively be applied to the case where detailed or minute rotational positions of a rotor need to be obtained.

Furthermore, the position detection circuit 3 includes the resistance circuit 22 which comprises the resistances 22u, 22v and 22w generating and imparting the virtual neutral point voltage necessary for computation of induced voltages eu, ev and ew. Consequently, the positional detection can be carried out even when connection to the neutral point of the motor 6 is difficult. Additionally, the position detection circuit 3 includes the multiplexer 21 selecting and supplying either the virtual neutral point voltage Vn' or externally supplied neutral point voltage Vn of the motor 6. Consequently, the neutral point voltage for use in the position detection can be selected according to individual conditions.

Figure 10:
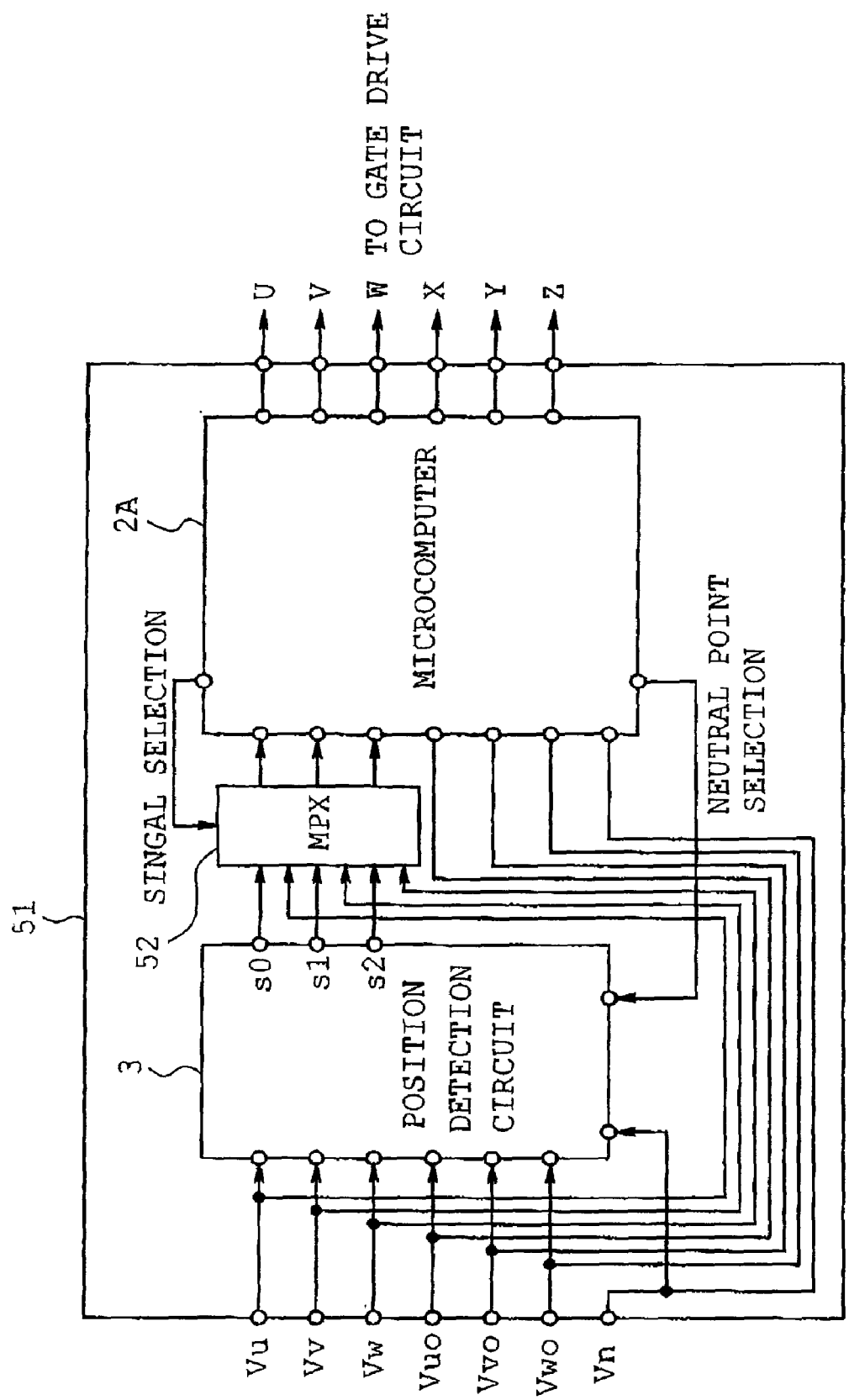
FIG. 10 is a view similar to FIG. 1, showing a second embodiment of the invention.
Figure 11:
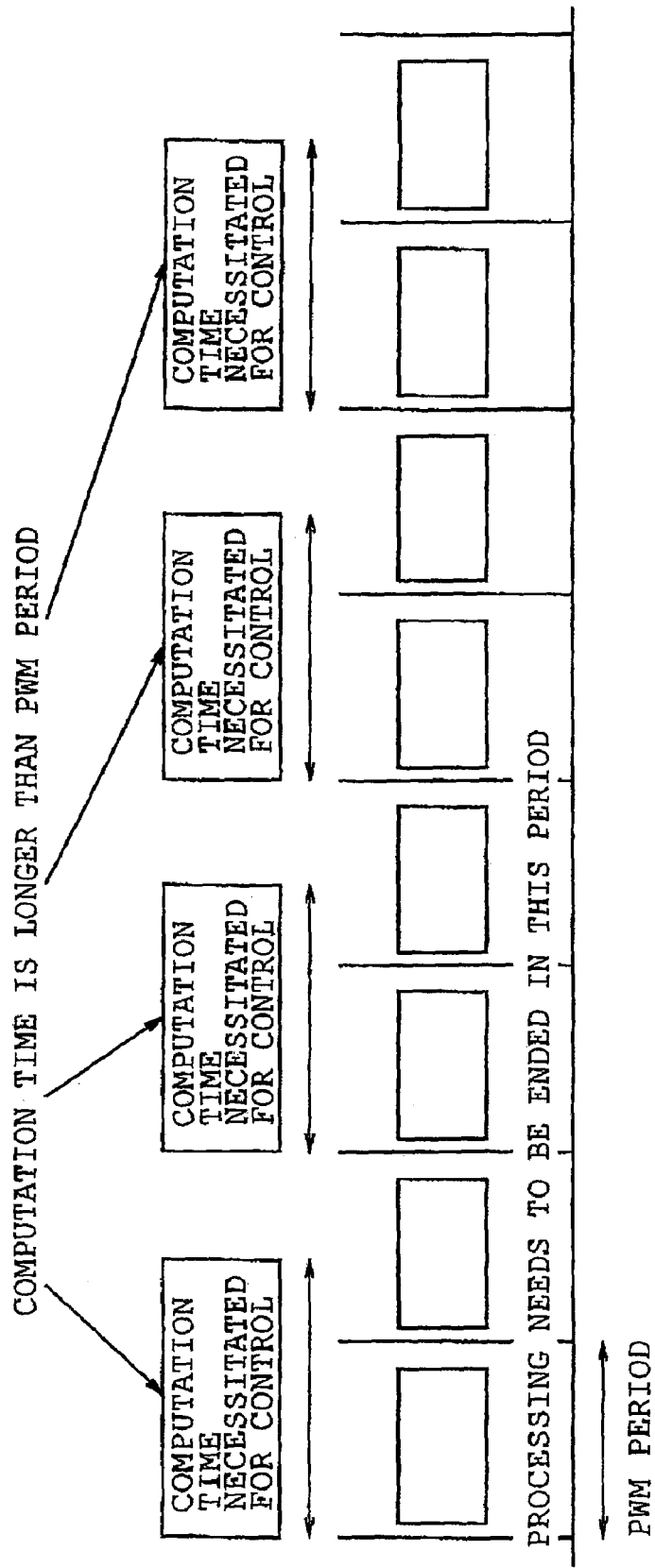
FIG. 11 is a timing chart explaining operation of a conventional microcomputer.

FIG. 10 illustrates a second embodiment of the invention, Identical or similar parts in the second embodiment are labeled by the same reference symbols as those in the first embodiment and description of these parts will be eliminated. The following describes only the differences of the second embodiment from the first embodiment. FIG. 10 is similar to FIG. 1 and more specifically shows an arrangement of the drive control IC 1 for the brushless DC motor. The drive control IC 51 of the second embodiment serves as a semiconductor device or a semiconductor integrated circuit device, or a motor control device. The drive control IC 51 comprises the microcomputer 2A, the position detection circuit 3 and the multiplexer 52 serving as the position signal selection unit. The multiplexer 52 is provided between the position detection circuit 3 and the microcomputer 2A for selecting either the position signals s0 to s2 delivered by the position detection circuit 3 or the voltage signals supplied to the input terminals Vu, Vv and Vw of the drive control IC 51. The microcomputer 2A controls the selecting operation. Furthermore, the drive control IC 51 has input terminals Vuo, Vvo, Vwo and Vn connected to the input ports of the microcomputer 2A.

The operation of the drive control IC 51 will now be described. In the second embodiment, the microcomputer 2A carries out selection of either the position signals s0 to s2 delivered by the position detection circuit 3 or the voltage signals supplied to the input terminals Vu, Vv and Vw of the drive control IC 51 or position signals detected by Hall ICs as in the conventional manner, for example.

As the result of the above-described arrangement, the drive control IC 51 can easily be used as a substitute for an arrangement of combination of the microcomputer 2 and a position sensor such as Hall ICs. For example, a conventional product has been provided which comprises a Hall IC detecting a rotor position of a brushless motor and uses the microcomputer 2 to carry out sine wave drive The product is proposed to be upgraded to the position sensorless drive system. Furthermore, the drive control IC 51 has a package size, pin configuration and the like which are designed so as to be compatible with the microcomputer 2. Then, before upgrade of the product (electronic device), the drive control IC 51 is substituted for the microcomputer 2. The microcomputer 2 is initialized so that the multiplexer 52 selects the input terminals Vu, Vv and Vw of the drive control IC 51. The position signals s0 to s2 delivered by three sensors are supplied to the aforesaid input terminals Vu, Vv and Vw. Consequently, the drive control IC 51 operates in the same manner as the conventional product.

When the product is upgraded to the position sensorless system, the input terminals of the drive control IC 51 are connected in the same manner as shown in FIG. 2 showing the first embodiment. When the microcomputer 2 is initialized so that the multiplexer 52 selects the output terminals of the position detection circuit 3, the same operation as in the first embodiment can be achieved.

According to the second embodiment, when adoption of the drive control IC 51 is decided for upgrade of the product, the drive control IC 51 can be used in the product even at the stage prior to upgrade. As a result, since the number of drive control ICs used is increased in total, a per-piece cost can be reduced.

The invention should not be limited to the foregoing embodiments. The embodiments may be modified or expanded as follows. The multiplexer 21 may or may not be provided, and either virtual neutral point voltage Vn' or neutral point voltage Vn of the motor 6 may be used. Furthermore, the capacitors 18a, 18b and 18c and the resistances 17a, 17b and 17c relating to the motor constants L and R may be arranged to be connected outside the drive control IC. Consequently, the constants can be adjusted according to the brushless DC motor used.

In the induced voltage comparison circuit 23, the induced voltages eu, ev and ew and the reference voltage Vr may be compared with each other so that zero-cross points of the induced voltages eu, ev and ew serve as reference points of electrical angle of 60°. Furthermore, the current detection unit may comprise a shunt resistance interposed between the source of lower arm side FET 5n of the inverter circuit 5 and the ground, instead of the shunt resistances 14u, 14v and 14w. Furthermore, the switching device composing the inverter circuit may be an IGBT, power transistor or the like, instead of FET. Additionally, the microcomputer 2 should not be limited to the product of Toshiba Corporation but may be any microcomputer constituted by the similar architecture.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A motor control device which is arranged so as to perform a PWM control for a permanent magnet motor including a rotor having a permanent magnet and a stator provided with a multiphase winding, the device comprising:
a position detection unit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages; and
a digital processing unit which has a function of generating and delivering a sinusoidal PWM signal based on the rotational position signal, thereby controlling the motor.

2. The motor control device according to claim 1, wherein the position detection unit is arranged so as to complete computation for generation of the rotational position within a predetermined control period of the PWM signal.

3. The motor control device according to claim 1, further comprising a resistance circuit which generates and imparts to the position detection unit a virtual neutral point voltage necessary for computation of the induced voltages.

4. The motor control device according to claim 3, further comprising a voltage selecting unit which supplies to the position detection unit either the virtual neutral point voltage or a neutral point voltage of the motor externally supplied thereto.

5. The motor control device according to claim 1, wherein the digital processing unit has an input port to which the rotational position signal is supplied, the motor control device further comprising a position signal selecting unit which selectively supplies to the input port of the digital processing unit either the rotational position signal delivered by the position detection unit or a motor position signal externally supplied thereto.

6. A motor control system comprising:
a permanent magnet motor including a rotor having a permanent magnet and a stator provided with a multiphase winding;
a position detection unit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages;
a digital processing unit which has a function of generating and delivering a sinusoidal PWM signal based on the rotational position signal, thereby controlling the motor; and
an inverter circuit which drives the motor based on the PWM signal delivered by the digital processing unit.

7. The motor control system according to claim 6, wherein the position detection unit is arranged so as to complete computation for generation of the rotational position signal within a predetermined control period of the PWM signal.

8. The motor control system according to claim 6, further comprising a resistance circuit which generates and imparts to the position detection unit a virtual neutral point voltage necessary for computation of the induced voltages.

9. The motor control system according to claim 8, further comprising a voltage selecting unit which supplies to the position detection unit either the virtual neutral point voltage or a neutral point voltage of the motor externally supplied thereto.

10. The motor control system according to claim 6, wherein the digital processing unit has an input port to which the rotational position signal is supplied, the motor control system further comprising a position signal selecting unit which selectively supplies to the input port of the digital processing unit either the rotational position signal delivered by the position detection unit or a motor position signal externally supplied thereto.

11. A semiconductor device which is arranged so as to perform a PWM control for a permanent magnet motor including a rotor having a permanent magnet and a stator provided with a multiphase winding, the semiconductor device comprising:
a position detection circuit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages; and a microcomputer which has a function of generating and delivering a sinusoidal PWM signal based on the rotational position signal, thereby controlling the motor.

12. The semiconductor device according to claim 11, wherein the position detection circuit is arranged so as to complete computation for generation of the rotational position signal within a predetermined control period of the PWM signal.

13. An electronic device which is arranged so as to perform a PWM control for a permanent magnet motor including a rotor having a permanent magnet and a stator provided with a multiphase winding, the electronic device comprising:
- a position detection circuit which executes an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering a rotational position signal of the rotor based on a phase relation of the induced voltages; and
- a microcomputer which has a function of generating and delivering a sinusoidal PWM signal based on the rotational position signal, thereby controlling the motor.

14. The electronic device according to claim 13, wherein the position detection circuit is arranged so as to complete computation for generation of the rotational position signal within a predetermined control period of the PWM signal.

15. A method of performing a PWM control for a permanent magnet motor including a rotor having a permanent magnet and a stator provided with a multiphase winding, wherein a microcomputer is used which has a function of generating and delivering a sinusoidal PWM signal based on a rotational position signal of the rotor, the method comprising executing an analog computation process for induced voltages of respective phases of the motor based on a phase voltage equation having, as operation terms, respective phase voltages, respective phase currents, winding inductance, winding resistance and a neutral point voltage, the winding inductance and the winding resistance being motor constants of the motor, thereby generating and delivering the rotational position signal based on a phase relation of the induced voltages.

16. The method according to claim 15, wherein the position detection circuit is arranged so as to complete computation for generation of the rotational position within a predetermined control period of the PWM signal.

* * * * *